(12) United States Patent
Hallam et al.

(10) Patent No.: US 7,044,149 B2
(45) Date of Patent: May 16, 2006

(54) PIPE FITTING

(75) Inventors: Peter John Hallam, Nottinghamshire (GB); Robert Philip Lennard, East Sussex (GB)

(73) Assignee: Hy-Ram Engineering Company Ltd., Mansfield (GB)

( * ) Notice: Subject to any disclaimer, the term of this patent is extended or adjusted under 35 U.S.C. 154(b) by 0 days.

(21) Appl. No.: 10/432,480

(22) PCT Filed: Nov. 21, 2001

(86) PCT No.: PCT/GB01/05129

§ 371 (c)(1),
(2), (4) Date: Nov. 20, 2003

(87) PCT Pub. No.: WO02/42678

PCT Pub. Date: May 30, 2002

(65) Prior Publication Data

US 2004/0069354 A1    Apr. 15, 2004

(30) Foreign Application Priority Data

Nov. 22, 2000 (GB) ................................. 0028390.3
Oct. 30, 2001 (GB) ................................. 0125970.4

(51) Int. Cl.
*F17D 1/00* (2006.01)

(52) U.S. Cl. .................... 137/15.09; 137/315.01; 137/613; 251/326; 251/329; 251/148

(58) Field of Classification Search ............ 137/613, 137/15.04, 15.05, 15.08, 15.09, 15.12, 315.01; 251/326, 328, 329, 148

See application file for complete search history.

(56) References Cited

U.S. PATENT DOCUMENTS

| | | | | |
|---|---|---|---|---|
| 2,882,921 A | * | 4/1959 | Webber | ................. 137/460 |
| 4,272,640 A | * | 6/1981 | Baumbach | ............. 137/110 |
| 4,355,656 A | | 10/1982 | Smith | |
| 4,528,041 A | | 7/1985 | Rickey et al. | |
| 4,654,537 A | * | 3/1987 | Gaspard | ................. 290/54 |
| 4,968,002 A | * | 11/1990 | Gibson et al. | .......... 251/266 |
| 2003/0140966 A1 | * | 7/2003 | Kempf et al. | ........... 137/337 |

FOREIGN PATENT DOCUMENTS

| | | | |
|---|---|---|---|
| DE | 31 47 295 A | | 6/1983 |
| JP | 404164292 A | * | 6/1992 |

* cited by examiner

*Primary Examiner*—Kevin Lee
(74) *Attorney, Agent, or Firm*—Nixon Peabody LLP (57) ABSTRACT

A pipe fitting with a body adapted for connection at a first end thereof to a supply pipe and at a second end thereof to a distribution pipe so as to permit fluid communication between the supply pipe and the distribution pipe. The body is provided with first valve device by which said fluid communication can be interrupted. The body is provided with an upstream port and a downstream port, respectively upstream and downstream, in use, of the first valve device. The upstream port and said downstream port permitting the first valve device to be by-passed and fluid from the supply pipe to be introduced to the distribution pipe.

42 Claims, 11 Drawing Sheets

Fig. 1

PRIOR ART

PIPE FITTING

FIELD OF THE INVENTION

This invention relates to a pipe fitting, and in particular but not exclusively to a pipe fitting of utility in the connection of a new water main to a public potable water distribution system.

BACKGROUND

Whenever a new water main is laid, for example to service a new housing development, it must be cleaned out and sterilised prior to connection to the existing mains, and also pressure-tested. The procedures involved are governed by stringent regulations.

In the United Kingdom the responsible authority is the Drinking Water Inspectorate (DWI). All methods currently approved by the DWI require two separate visits to site to carry out pipe fitting operations. DWI requires the positive isolation of new mains until they have successfully passed a bacteriological test after sterilisation.

Figure 1:
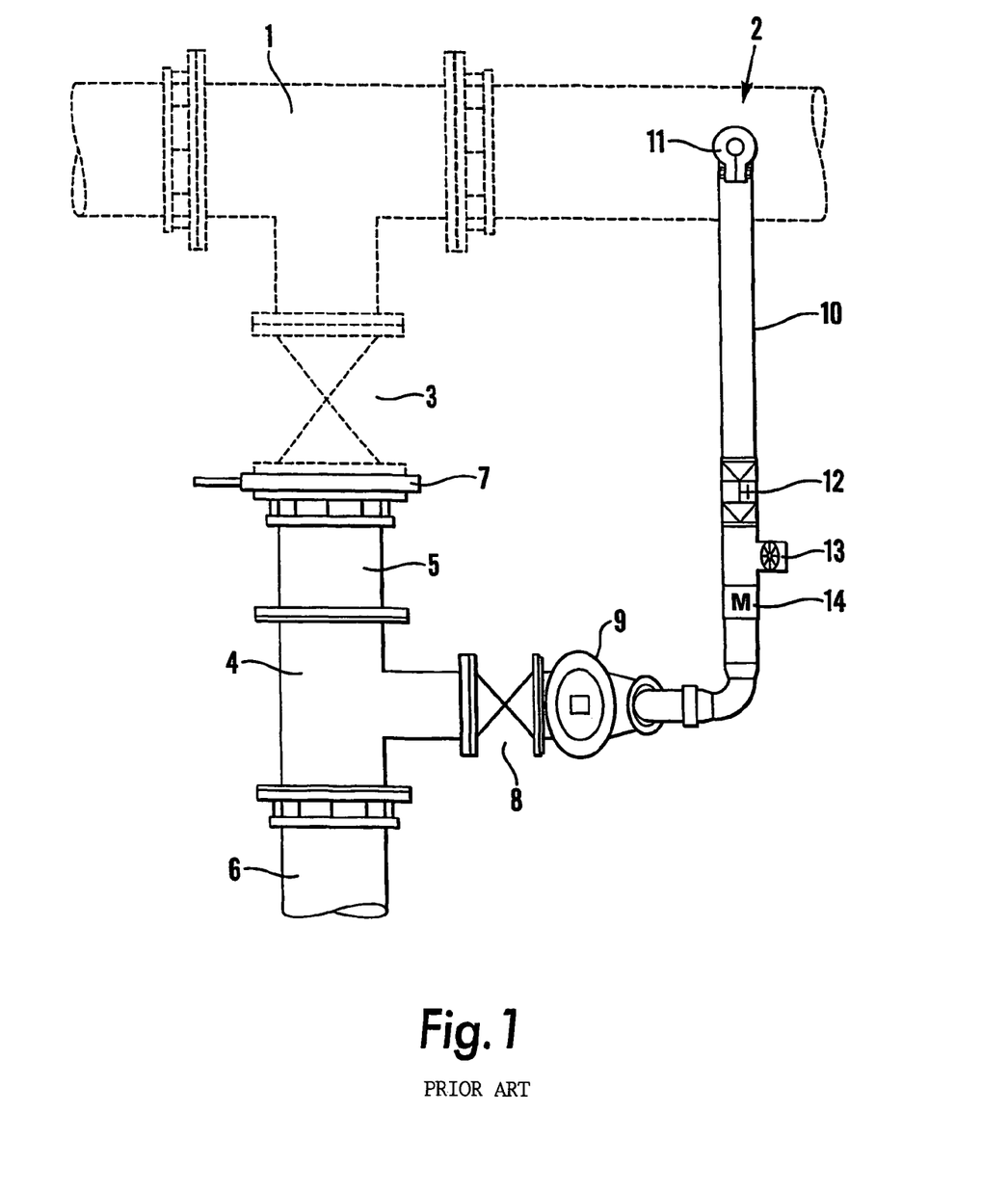
FIG. 1 is a schematic plan view of a first conventional arrangement for connection of a new water main to an existing potable water main.

One known method of satisfying DWI regulations is illustrated in FIG. 1. In this method, a flanged T-piece connector 1 is installed in the existing main 2. The side arm of the T-piece 1 is connected to a sluice valve 3. Temporary works comprising a further flanged T-piece 4 and a flanged spigot 5 are installed between the sluice valve 3 and the new main 6. To achieve the desired isolation, however, a steel plate 7 (known as a "spade") is interposed between the sluice valve 3 and the new main 6. The side arm of the second T-piece 4 is connected via a sluice valve 8 to a fire hydrant 9. The fire hydrant 9 is connected via a temporary by-pass-pipe 10 to a tapping 11 on the existing main 2. The by-pass pipe 10 is fitted with a double non-return check valve 12, an injection point 13 for sterilant and a meter 14.

The arrangement shown in FIG. 1 suffers from numerous disadvantages. First, the formation of the mains tapping 11 on the existing main 2 is problematic. It involves working on the main 2 while the main is under pressure and this carries a certain safety risk. If any problems occur when the tapping 11 is being made, the necessary remedial action may involve considerable interruption to the supply carried by the existing main 2. Secondly, after the new main 6 has been successfully connected to the existing supply, the temporary works (second T-piece 4, fire hydrant 9 etc) are generally discarded. This is wasteful and expensive.

Figure 2:
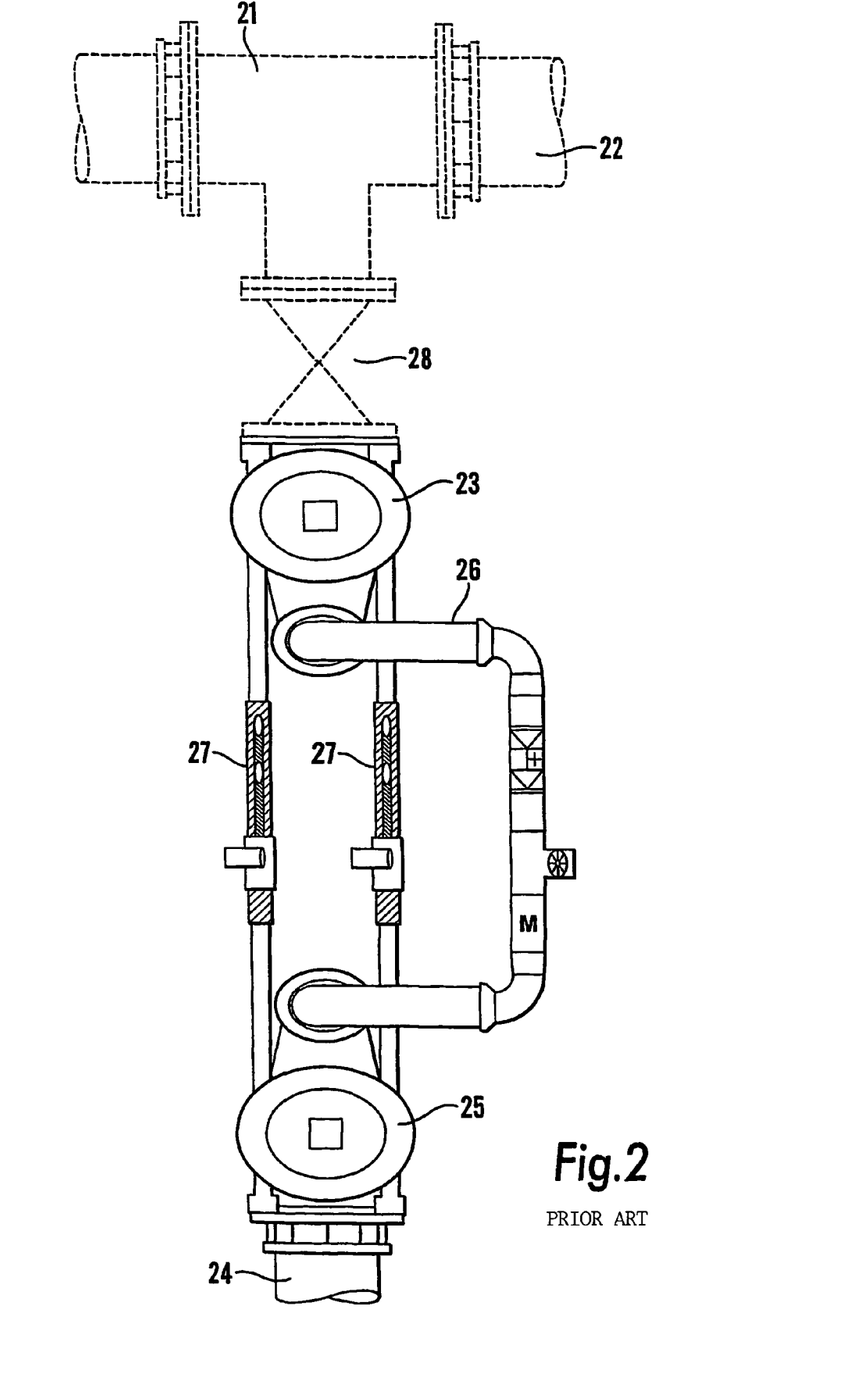
FIG. 2 is a view similar to FIG. 1 of a second conventional arrangement.

Another standard method of commissioning a new main is illustrated in FIG. 2. In this case, the T-piece 21 installed in the existing main 22 is connected via a sluice valve 28 to a first fire hydrant 23, and the end of the new main 24 is connected to a second fire hydrant 25. The two hydrants 23,25 are connected by a temporary by-pass pipe 26, as in the first method. The two hydrants 23,25 are braced apart by telescopic struts 27. While this method does not involve any live operations on the existing main 22, it still involves the installation of temporary works which are generally subsequently discarded.

The most fundamental problem with both the methods described above, however, and with variations on those methods that are also commonly used, is that connection of the new main to the existing supply after sterilisation necessarily involves removal of at least some of the temporary components so that the steel spade (first method) or one or both hydrants (second method) can be removed. Thus, after the new main has been sterilised it is once again exposed to the environment, leading to a risk of chemical or bacteriological contamination. It is precisely that risk that the regulations governing the procedure are intended to eliminate.

SUMMARY

There has now been devised a pipe fitting and a method of utilisation thereof which overcomes or substantially mitigates the above-mentioned or other disadvantages of the prior art.

According to a first aspect of the invention, there is provided a pipe fitting comprising
a body adapted for connection at a first end thereof to a supply pipe and at a second end thereof to a distribution pipe so as to permit fluid communication between the supply pipe and the distribution pipe, the body being provided with first valve means by which said fluid communication can be interrupted, and the body being provided with an upstream port and a downstream port, respectively upstream and downstream, in use, of said first valve means, said upstream port and said downstream port permitting the first valve means to be by-passed and fluid from the supply pipe to be introduced to the distribution pipe.

Where the pipe fitting is used in the commissioning of a new potable water main, that new main constitutes the distribution pipe and the supply pipe is an existing main to which the new main is connected. In general, as used herein, the term "supply pipe" denotes a pipe upstream of the pipe fitting from which, in use, fluid flows to the pipe fitting and "distribution pipe" denotes a pipe downstream of the pipe fitting by which fluid flows away from the pipe fitting.

The pipe fitting according to the invention is advantageous primarily in that the first valve means effectively isolates the new main from the existing water supply during commissioning of the new main, yet the first valve means can be opened after the new main has been sterilised without exposing the new main to the environment. A particularly important benefit of the use of the pipe fitting according to the invention is that it enables complete sterilisation of a new water supply main. This is in contrast to current methods of commissioning new water mains which necessarily result in certain lengths, sometimes 10 m or more, not being sterilised at all. Use of the pipe fitting also substantially eliminates the need for temporary works and the associated waste of resources. Furthermore, the first valve means may readily be opened at any time subsequent to commissioning of the new main to temporarily interrupt water flow along the new main, for instance to enable maintenance or repair work to be carried out.

The first valve means may take the form of a closure plate adapted to be received within the body of the pipe fitting.

The closure plate may be of any material having suitable toughness and durability to withstand the pressures to which it will be exposed during use. Most preferably, the closure plate is of a suitable metal, eg steel.

The closure plate is most preferably engageable with the body of the pipe fitting with a sliding action. The closure plate most preferably slides in a slot formed in the body of the fitting, most preferably transverse to the longitudinal axis of the pipe fitting. Suitable seals, eg of an elastomeric material such as neoprene, are preferably provided around the periphery of the slot and/or the periphery of the closure plate to prevent leakage of water or other fluid past the closure plate.

The closure plate may be completely removable from the pipe fitting, the seals around the slot serving to close and seal the slot when the closure plate is so removed. Once the closure plate has been removed in this way, a suitable capping member may be applied to the pipe fitting to completely and securely close the slot and prevent escape of water under pressure from within the pipe fitting. In such a case, the first valve means may constitute a valve of the "spade" type.

In other embodiments, the closure plate may not be completely removable but may instead be retractable from its operative position, in which flow of fluid through the pipe fitting is interrupted, into a recess or enclosure forming part of the pipe fitting.

To facilitate sliding movement of the closure plate, the closure plate is preferably formed with suitable means for engagement by the operator. Where the closure plate extends externally of the pipe fitting, such means may simply comprise formations by which the closure plate may be grasped manually by the operator so as to be drawn out of the pipe fitting or pressed into the pipe fitting. More preferably, however, there are also provided means by which the closure plate may be acted upon by mechanical means effective to slide the closure plate into or out of the pipe fitting. Such mechanical means may, for instance, comprise jacking means having a threaded spindle by rotation of which the closure plate may be moved. Conveniently, a spigot is mounted on the spindle so that rotation of the spindle causes the spigot to move relative to the foot of the jacking means. If the spigot is engaged in the closure plate, rotation of the spindle thus causes the closure plate to be drawn in or out of the pipe fitting. The advantage of the use of such a jacking means is primarily that it enables the closure plate to be moved in a controlled manner which, for instance, reduces the risk of the new main being exposed to sudden increases in pressure.

Where the closure plate is retained and accommodated within the pipe fitting, it is preferably linked to an actuating mechanism that is operable from the exterior of the pipe fitting. The closure plate may, for instance, be mounted on a threaded spindle which projects from the pipe fitting and by rotation of which the closure plate may be raised or lowered. A particularly preferred form of such a closure plate constitutes a valve of the "resilient-seat" type, in which the closure plate has a coat of a resilient, commonly elastomeric, material.

The upstream and downstream ports are preferably aligned symmetrically on either side of the closure plate. Since the pipe fitting will most commonly be fitted below ground level, it is convenient for the upstream and downstream ports to be readily accessible from above. This is most readily achieved if the ports open upwardly in use. However, it is preferred, at least for the downstream port, for the ports to open into the interior of the pipe fitting horizontally, the outlet of the downstream port most preferably being aligned with the centre of the pipe fitting. This may be a regulatory requirement, since such an arrangement optimises the mixing and distribution of sterilant introduced via the downstream port into the flow of, for example, water through the pipe fitting.

The upstream and downstream ports are preferably fitted, in use, with suitable valves, the valves also being adapted for connection to the ends of a temporary by-pass pipe similar to that used in the prior art methods described above. The upstream and downstream ports are preferably capable of being closed off, so that the valves can be removed once the new main is fully commissioned. To this end, the ports are preferably adapted to receive closure caps which can preferably be fitted through the valves using an "under-pressure" tool of a type which is known per se.

As in the prior art, temporary connection between the existing main and the isolated new main is achieved by means of a by-pass pipe which in the case of the invention extends from the upstream port to the downstream port. As in the prior art, the by-pass pipe will generally be fitted with at least one, and more preferably two, non-return check valves to prevent flow of water from the new main to the existing main. The by-pass pipe will generally also be fitted with a flow meter and, downstream of the non-return valve(s) also with an injection point for sterilant.

Thus, according to a second aspect of the invention, there is provided a pipe assembly comprising a supply pipe and a distribution pipe, and a pipe fitting interposed therebetween, said pipe fitting comprising a body connected at a first end thereof to the supply pipe and at a second end thereof to the distribution pipe so as to permit water to flow from the supply pipe to the distribution pipe, the body being provided with first valve means by which said flow can be interrupted, and the body being provided with an upstream port and a downstream port, respectively upstream and downstream, in use, of said first valve means, said upstream port and said downstream port permitting the first valve means to be by-passed and water from the supply pipe to flow via a by-pass pipe connected to the upstream and downstream ports to the distribution pipe.

As described above, the supply pipe may be an existing potable water main and the distribution pipe a new main connected to the existing main.

Although the first valve means may in many cases be adequate to achieve complete and satisfactory isolation and separation of the new main from the existing main, in order to further ensure that the isolation is complete a second valve means may be provided, the first and second valve means being spaced apart on the longitudinal axis of the pipe fitting.

In such a case, the upstream port is, in use, upstream and the downstream port is downstream of both first and second valve means.

Preferably, both first and second valve means comprise a closure plate adapted to be received within the body of the pipe fitting. Where two closure plates are provided, in the event of leakage of water past either of the closure plates, such water will accumulate in the space between the closure plates and will not be forced under pressure past the other. The space between the closure plates may be provided with an outlet by which any such accumulated water may be drained or pumped off. If the space between the two closure plates is vented then that space will be at lower pressure than both the new and existing mains, thereby ensuring that any leakage past either closure plate is into that space and not into either main.

Where the pipe fitting includes both first and second valve means, it is preferred that at least one of the valve means is of a design suitable for closing off dynamic flow of fluid through the pipe fitting. Where the bore of the pipe fitting is relatively small and/or where the fluid flows at relatively low pressure, simple spade-type valves may be suitable. In other applications, however, a valve having a more robust closure plate, with mechanical actuation, may be preferable. It is particularly preferred to utilise a gate valve comprising a robust closure plate driven by rotation of a threaded spindle, the closure plate being mounted on the spindle such that rotation of the spindle causes the closure plate to be raised or lowered. A particularly preferred form of such a valve is a resilient-seat valve, in which the closure plate has a coat of a resilient, commonly elastomeric, material.

Where the pipe fitting incorporates both a spade-type valve and a resilient-seat valve or similar, the pipe fitting is preferably installed with the latter valve upstream of the former.

The applications in which the pipe fitting according to the invention is of particular utility will generally involve pipes with bores of the order of several tens of millimetres and greater. Typically, the pipes will have bores greater than 50 mm, eg 80 mm, 100 mm or 120 mm. For most applications, the bore will not be greater than several hundred millimetres, eg 600 mm or less, more commonly less than 250 mm. Most commonly, the pipe fitting will have an internal bore that matches the bore or internal diameter of the pipes to which it is fitted.

According to a further aspect of the invention, there is provided a method of connecting a new water main to an existing water main, which method comprises the steps of
a) installing between the existing main and the new main a pipe fitting provided with first valve means movable from an open position in which the existing main and the new main are in communication, to a closed position in which water flow from the existing main to the new main is interrupted;
b) forming a temporary conduit from an upstream port in said body to a downstream port in said body, said temporary conduit containing unidirectional valve means and means for injecting a sterilant into said temporary conduit;
c) with first valve means in the closed position, flushing the new main with water from the existing main via the temporary conduit;
d) closing off and removing the temporary conduit; and
e) moving the first valve means to the open position.

Although described herein primarily with reference to the commissioning of a new potable water main, the pipe fitting according to the invention may be useful in many other applications, including foul water or sewerage applications. The pipe fitting may be of utility as a replacement or substitute for conventional valves.

It will also be appreciated that the pipe fitting according to the invention may be incorporated into components of various forms, eg T-pieces or the like.

BRIEF DESCRIPTION OF THE DRAWINGS

The invention will now be described in greater detail, by way of illustration only, with reference to the accompanying drawings, in which.

DETAILED DESCRIPTION

FIGS. 1 and 2 illustrate known methods for isolating a new water main from an existing public potable water main, and have been described above.

Figure 10:
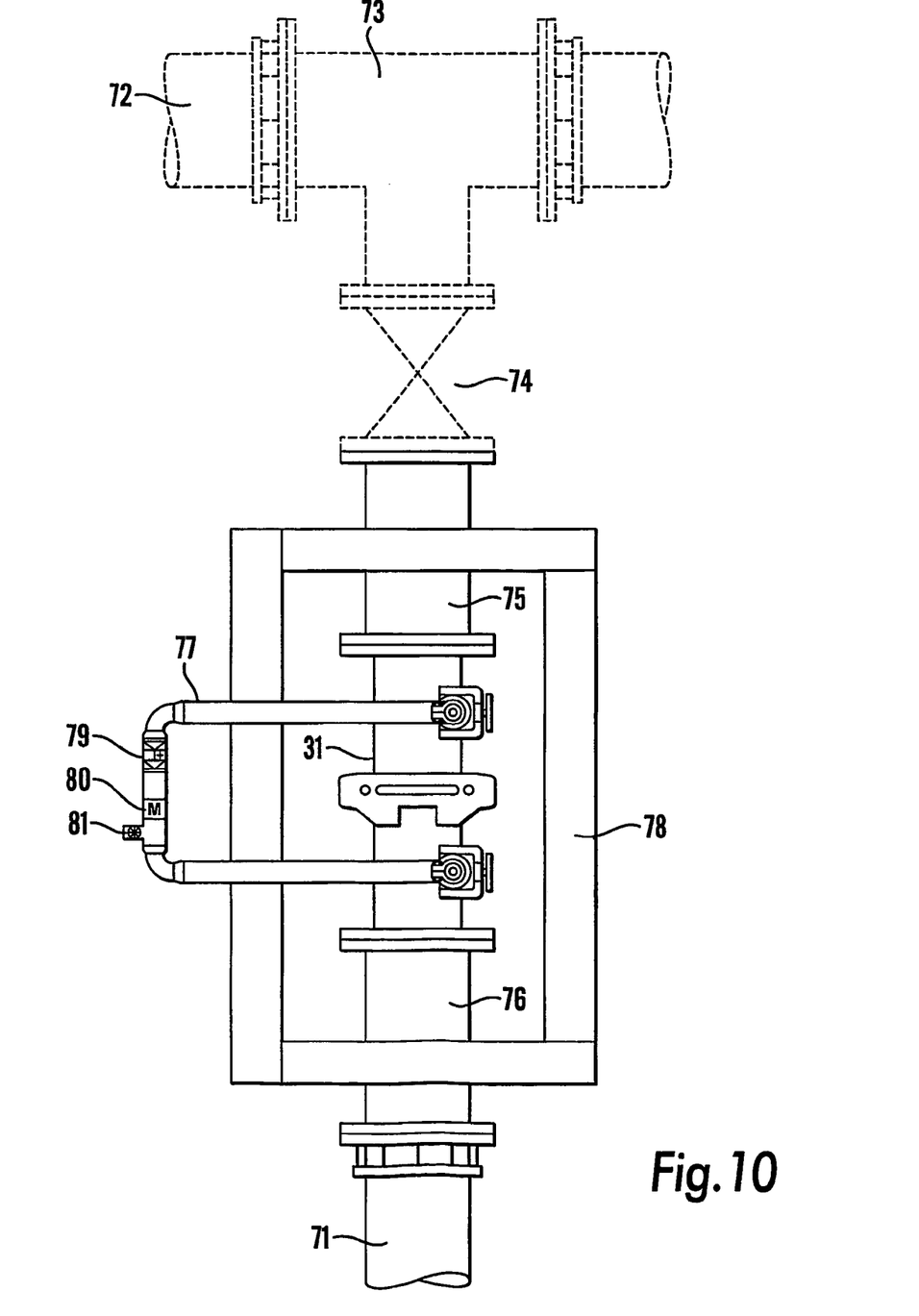
FIG. 10 is a view similar to FIGS. 1 and 2 of the pipe fitting of FIGS. 3 to 8 in use.

FIGS. 3 to 8 illustrate a first embodiment of a pipe fitting (generally designated 31) according to the invention and FIG. 10 illustrates the manner in which the pipe fitting 31 is used.

Figure 3:
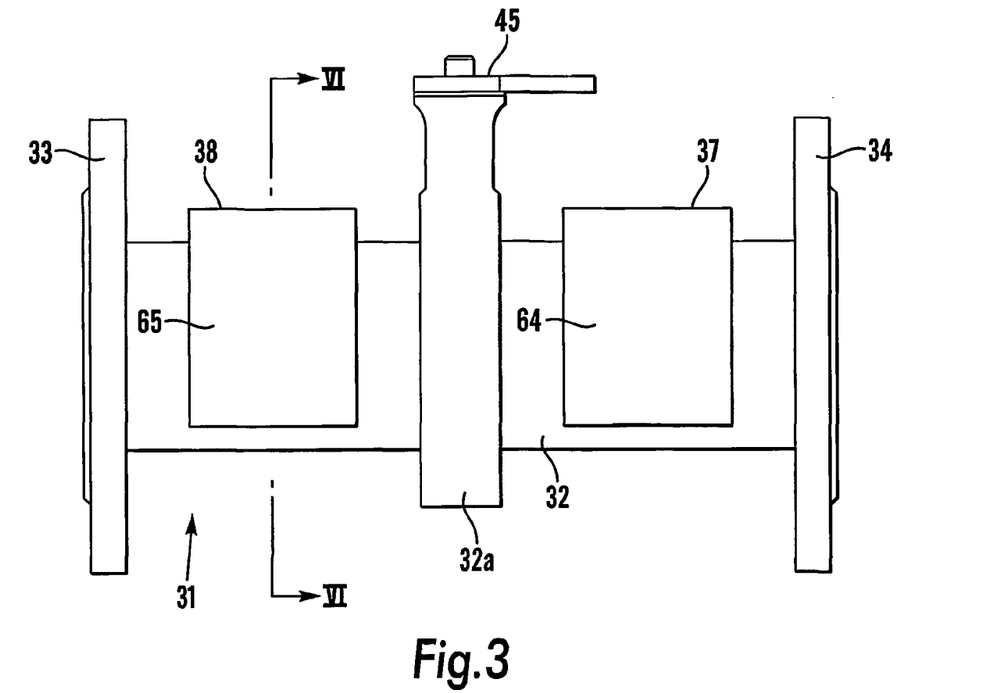
FIG. 3 is a side view of a first embodiment of a pipe fitting according to the invention.
Figure 4:
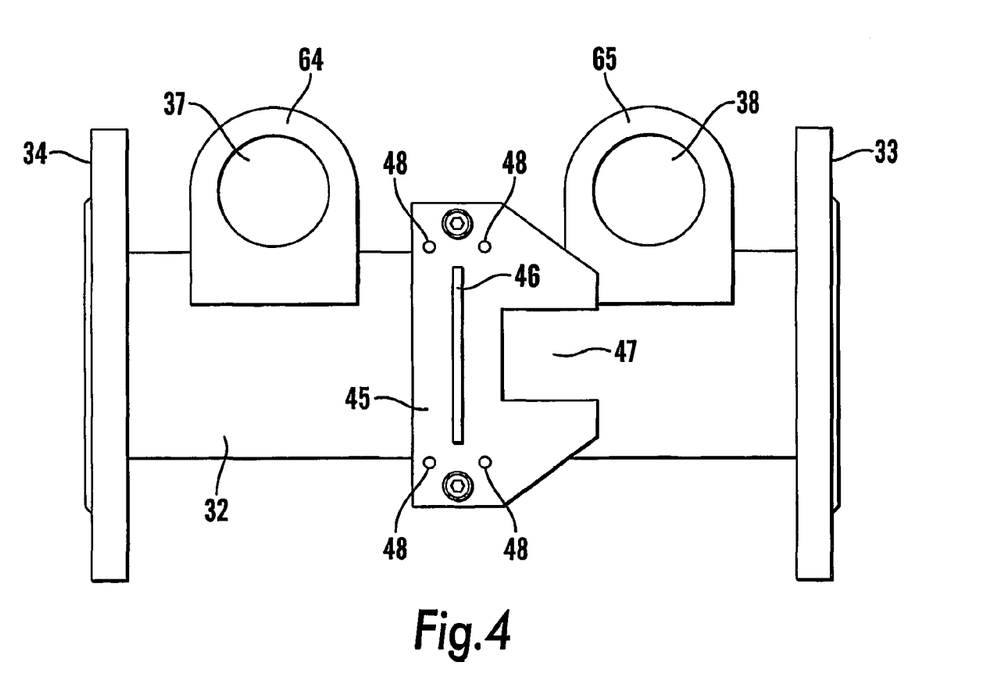
FIG. 4 is a plan view of the pipe fitting of FIG. 3.
Figure 5:
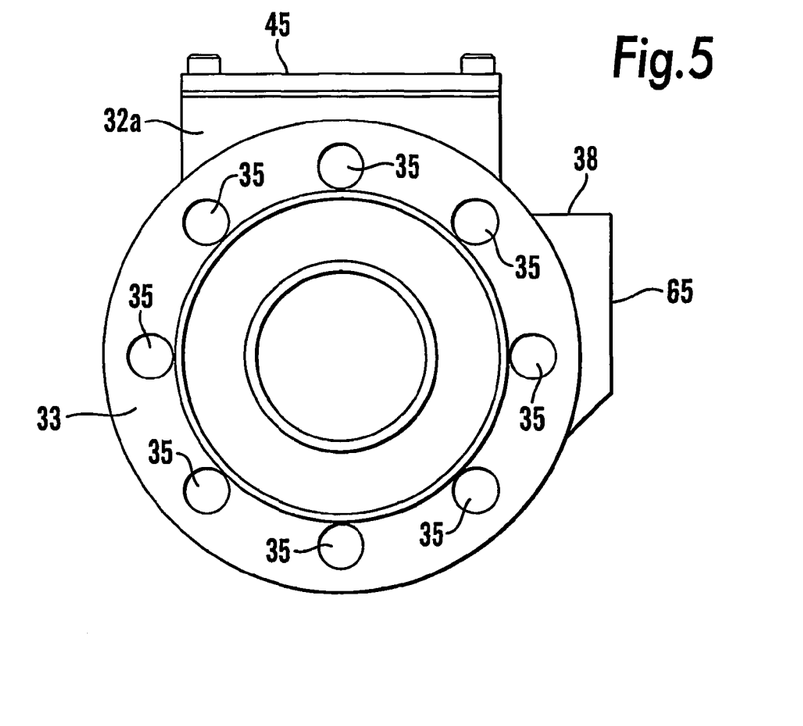
FIG. 5 is an end view of the pipe fitting of FIGS. 3 and 4.

Referring first to FIG. 3, the pipe fitting 31 is cast or otherwise formed as a unitary component inductile iron or other suitable material. It comprises a body 32 of generally tubular form, the body 32 having at each end thereof an annular flange 33,34 for attachment to adjacent components. The flanges 33,34 are formed with spaced apart holes 35 (see FIG. 5) through which threaded bolts can be passed.

The central part 32a of the body 32 is enlarged relative to the rest of the body and receives in use a closure plate 36, in a manner described more fully below. Ports 37,38 are provided at each side of the central part of the body 32, between that part of the body 32 and the respective flanges 33,34.

A plate 45 is bolted to the top of the enlarged central part of the body 32. The plate 45 is formed with a slot 46 through which the closure plate 36 can be inserted, and with a cut-out 47 which serves for location of a jack, as described below.

Figure 6:
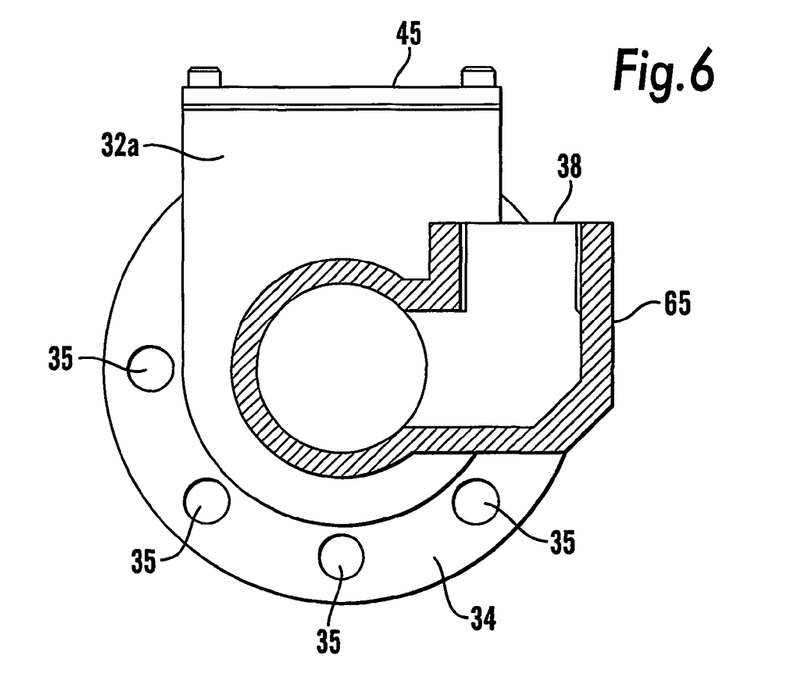
FIG. 6 is a sectional view on the line VI—VI in FIG. 3.
Figure 7:
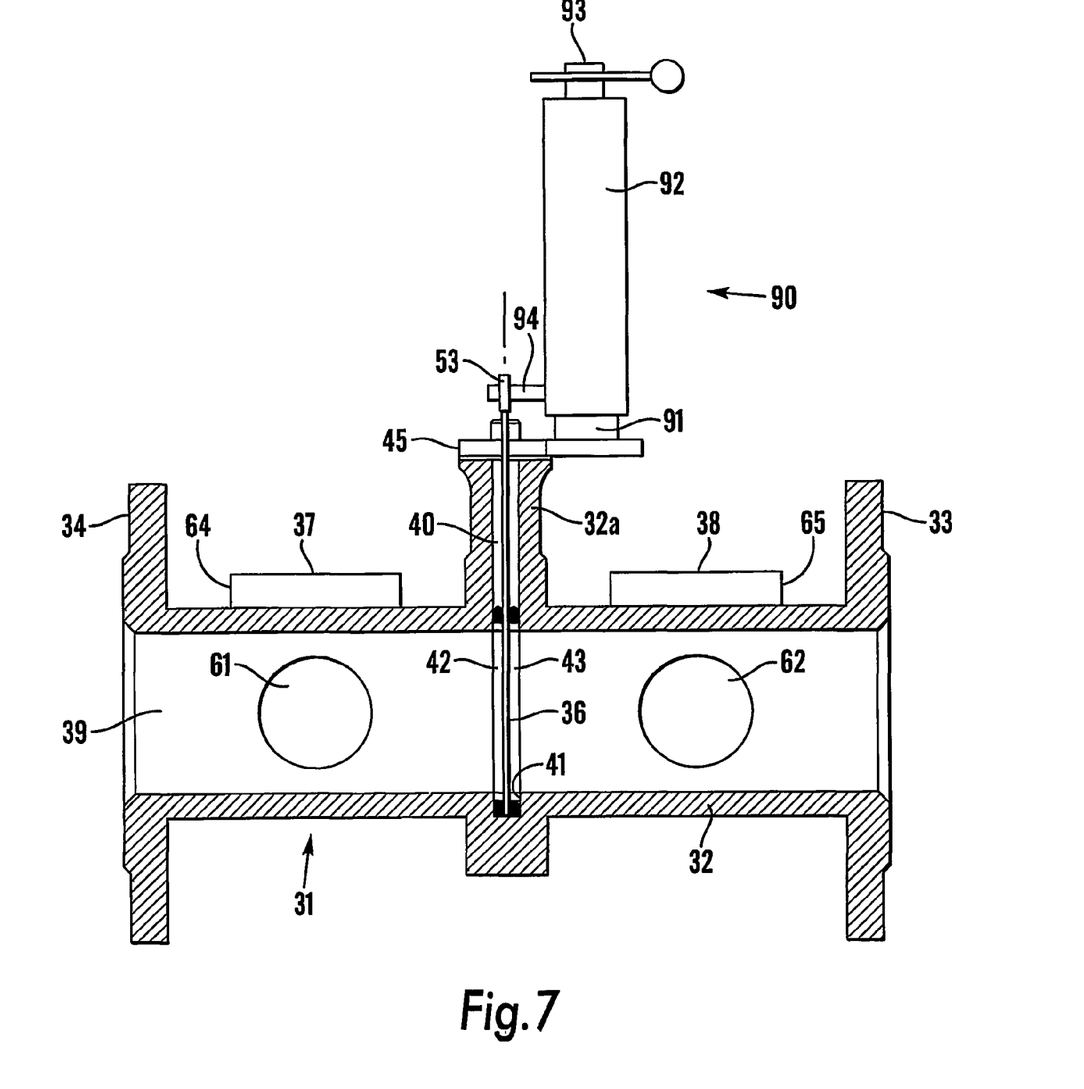
FIG. 7 is a sectional side view of the pipe fitting of FIG. 3 with a closure plate in a closed position and a jack fitted.
Figure 8:
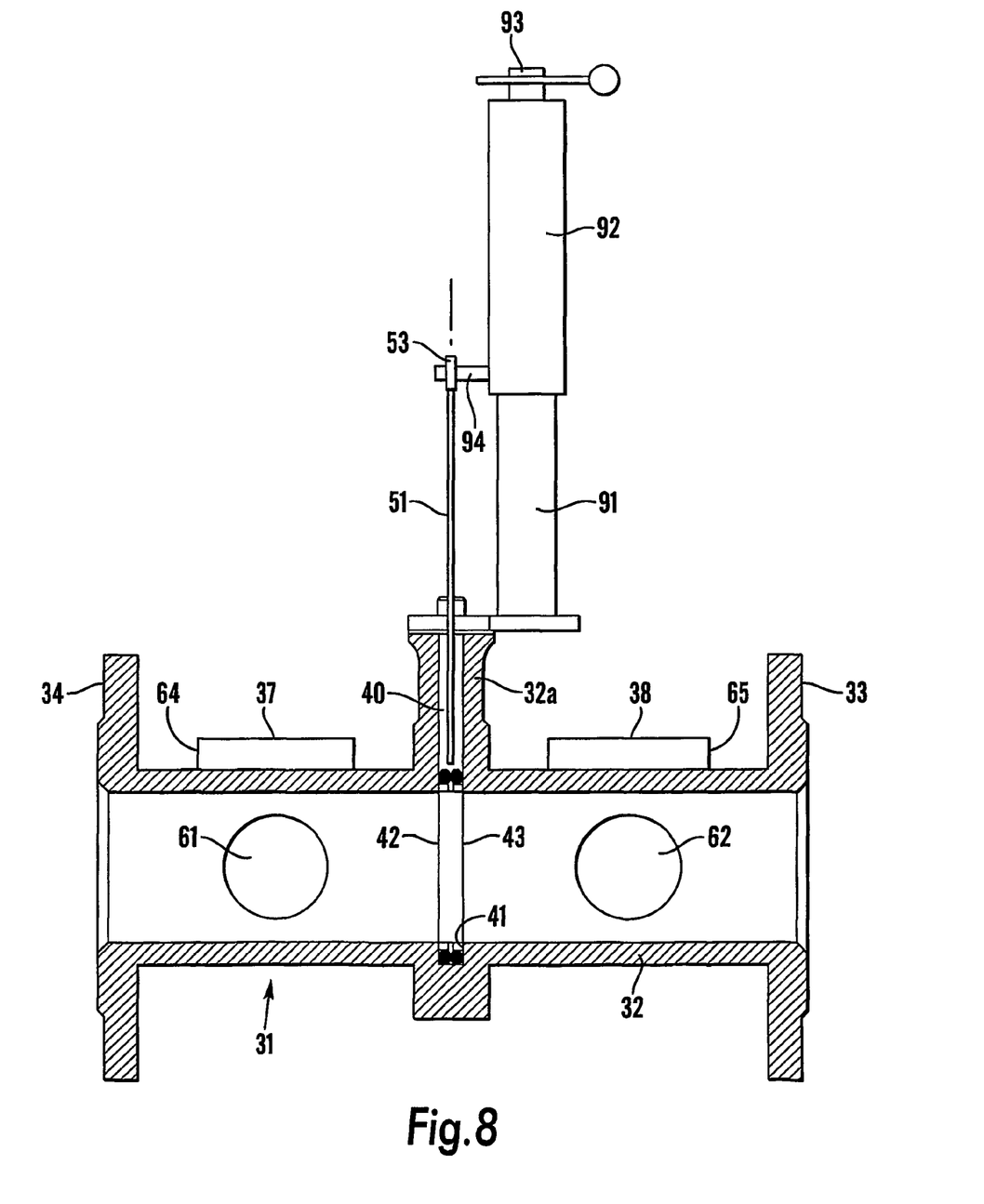
FIG. 8 is a view similar to FIG. 7 but with the closure plate raised to an open position.

The internal construction of the fitting 31 is shown in FIGS. 6 to 8. As can be seen in FIGS. 7 and 8, the fitting 31 has a circular bore 39 which is dimensioned appropriately for use of the fitting 31 with a particular diameter of mains pipe. In the enlarged central part 32a of the body 32 a slot 40 (aligned with the slot 46 in the plate 45) extends from the top of the fitting 31 into a peripheral annular groove 41 formed in the internal wall of the bore 39. A pair of gaskets 42,43 (of neoprene or similar material) are fitted into that groove 41.

Figure 9:
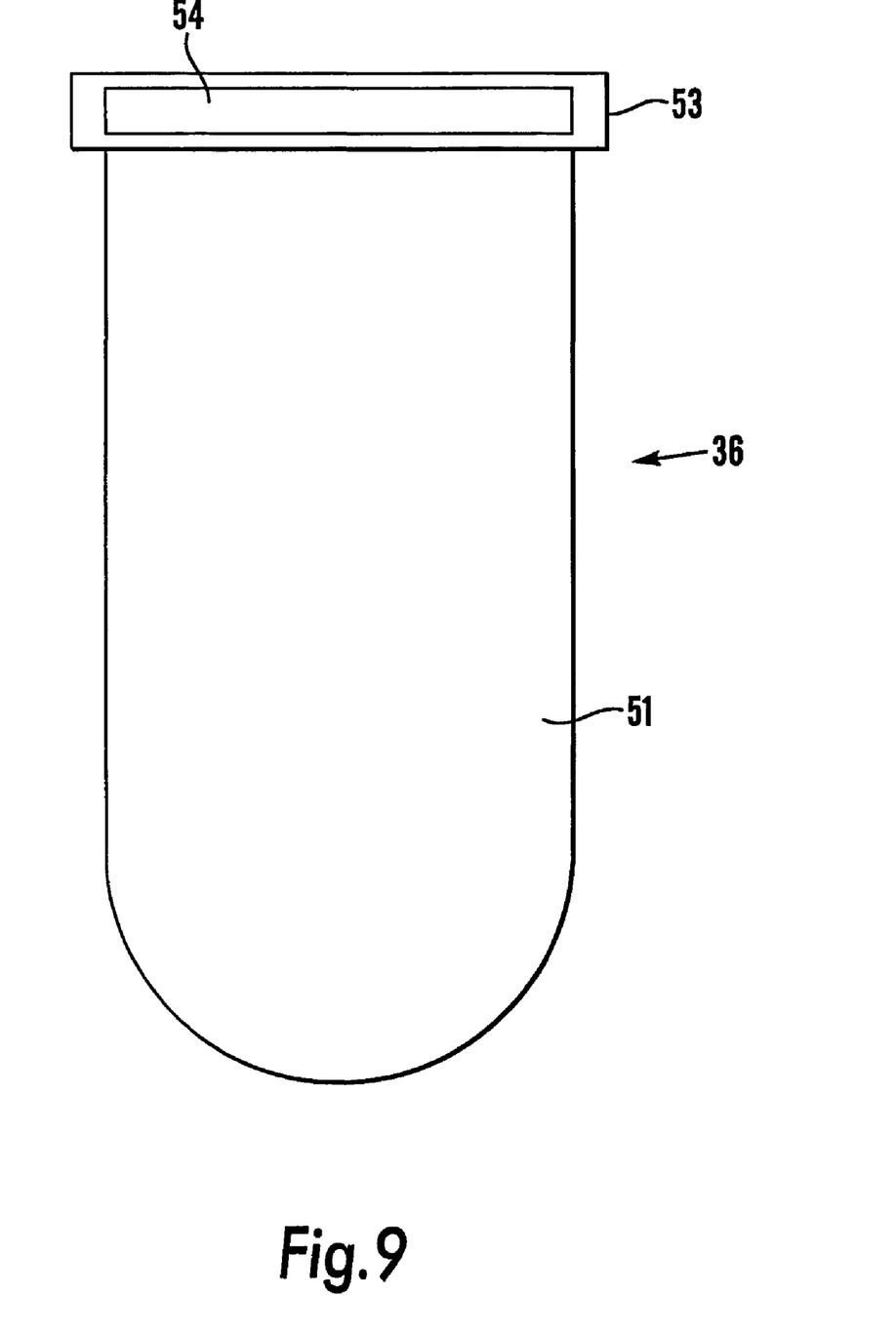
FIG. 9 shows a closure plate used in the pipe fitting of FIGS. 3 to 8.

The fitting 31 is used with the closure plate 36 which is shown in FIG. 9. The closure plate 36 comprises a flat steel plate 51 having a radiussed lower end, the radius corresponding to that of the groove 41. The upper end of the closure plate 36 is formed with a moulded handle 53 having a central opening 54. The closure plate 36 can be inserted via the slots 40 and 46 through the top of the fitting 31 and pressed downwards until its lower end seats in the groove 41. In this condition the closure plate 36 is held between the gaskets 42,43 and separates one end of the fitting 31 from the other.

Referring once again to FIGS. 7 and 8, and also to FIG. 6, the ports 37,38 are formed in lateral extensions 64,65 formed on one side of the fitting 31. The ports 37,38 open into the bore of the fitting 31 via respective openings 61,62. As can be seen, the openings 61,62 are aligned with the longitudinal axis of the fitting 31, and the terminal portions of the ports 37,38 are disposed horizontally.

As shown in FIGS. 7 and 8, the closure plate 36 can be raised or lowered by means of a jack 90. With the closure plate 36 in the closed (lowered) position, as shown in FIG. 7, the jack 90 is engaged with the cut-out 47 in the plate 45.

Grooves (not visible in the drawings) in the foot of the jack 90 provide for positive engagement of the jack 90 with the plate 45. The jack 90 comprises a pair of telescopic components 91,92, the upper one of which 92 is mounted on a threaded spindle 93 such that rotation of the spindle 93 causes relative movement of the two components 91,92. A spigot 94 extends from the upper component 92 through the opening 54 in the handle 53 of the closure plate 36. Manual rotation of the spindle 93 thus causes the closure plate 36 to be raised to the open position shown in FIG. 8. Rotation of the spindle 93 in the other sense drives the closure plate 36 back to the FIG. 7 position.

Manual raising and lowering of the closure plate 36 (ie without using the jack 90) will generally be possible, but use of the jack 90 enables far more controlled opening and closing of the pipe fitting 31.

The manner in which the fitting of FIGS. 3 to 8 is used will now be described, with reference to FIG. 10. The pipe fitting 31 is used in the connection of a new water main 71 to an existing public potable water main 72. As with conventional methods of making such a connection, a T-piece connector 73 is first inserted in the existing main 72, the side arm of the T-piece 73 being closed off by a sluice valve 74.

The pipe fitting 31 is then interposed between the sluice valve 74 and the new main 71 and connected to both by means of double-flanged extension pipes 75,76. An underground chamber 78 is built around the pipe fitting 31. The ports 37,38 are fitted with 2" (50 mm) gate valves which are connected together by temporary by-pass pipe 77 which is typically of 50 mm o.d. MDPE pipework with 1.5 inch nominal bore fittings. The pipe 77 is fitted with a double check valve assembly 79 and a check meter 80. The pipe 77 is also fitted with a connection point 81 for chlorination and pressure testing of the new main 71. The temporary by-pass pipe 77 may be several metres in length to provide for easy access and to facilitate the operations required during commissioning of the new main 71.

Once the necessary components have been connected up as just described, and with the closure plate 36 pressed into the slot in the pipe fitting 31, the sluice valve 74 can be opened. Flow of water from the existing main 72 to the new main 71 is prevented by the closure plate 36. When the closure plate 36 is in this position, it may be locked in place by a padlock and chain or similar means, thereby preventing inadvertent or malicious removal of the closure plate 36 until commissioning of the new main 71 is complete.

The new main 71 may be flushed out by opening of the gate valves fitted to the ports 37,38, thereby allowing water to flow along the bypass pipe 77. The pressure of water introduced into the new main 71 in this manner may be used to flush out the new main 71. This will normally be done by using the pressure of water to drive one or more cleansing swabs through the new main 71.

Once the new main 71 is clean and has been emptied of water disinfection can be carried out. The new main 71 is filled once again with water from the existing main 72 and a disinfection chemical, most commonly sodium hypochlorite, is dosed into the by-pass pipe 77 via the injection point 81 and filling the new main 71 downstream of the check valves 79. After a prescribed period the new main 71 is emptied and again filled with water from the existing main 72 through the by-pass pipe 77. Samples of water are taken from the new main and sent to a laboratory for bacteriological analysis. Only when the results of the analysis show that disinfection has been satisfactorily achieved can the new main 71 be connected directly to the public potable water distribution system of which the existing main 72 forms part.

The closure plate 36 is unlocked and raised using the jack 90 and withdrawn fully from the slots 40,46. The slot 46 can then be sealed by fitting of a capping plate and gasket (not shown) to the plate 45. The plate 45 has four threaded bores 48—see FIG. 4—for this purpose. The gate valves fitted to the ports 37,38 are closed and the temporary by-pass pipe 77 is removed. The ports 37,38 can be closed off with caps applied through the gate valves using an under-pressure tool, in a manner known per se, and the gate valves removed.

Figure 11:
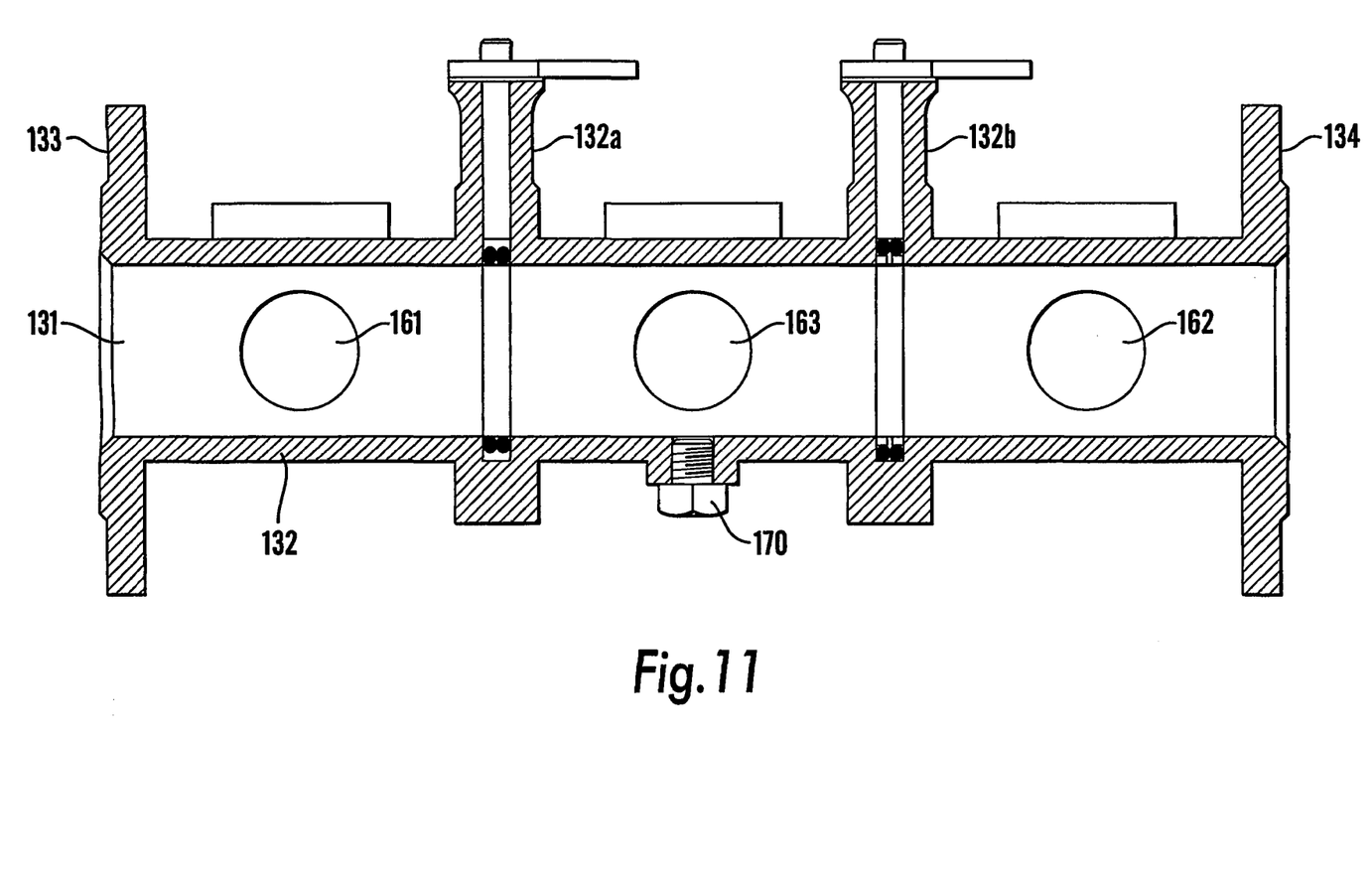
FIG. 11 is a view similar to FIG. 7 of a second embodiment of a pipe fitting according to the invention.
Figure 12:
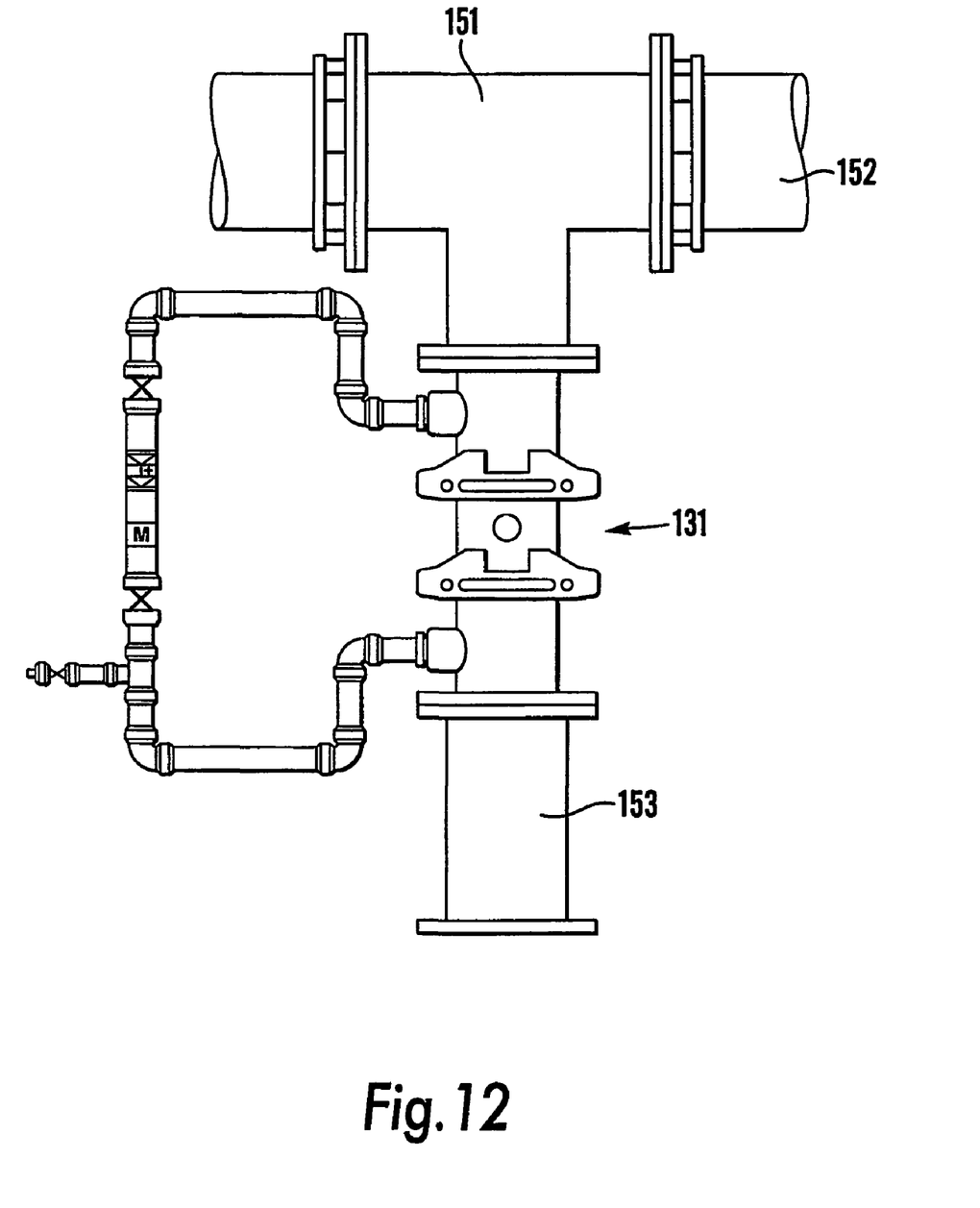
FIG. 12 is a view similar to FIG. 10 of the embodiment of FIG. 11, in use.

Turning now to FIGS. 11 and 12, a second embodiment of a pipe fitting according to the invention is generally designated 131 and is of similar construction to the first embodiment 31, save that its body 132 has two enlarged portions 132a, 132b which are identical in construction to the enlarged portion 32a of the first embodiment. Also, in addition to ports 161,162 which correspond in form and function to the ports 61,62 of the first embodiment, in this version of the pipe fitting, a further outlet port 163 is provided, between the two enlarged portions 132a, 132b of the body 132. There is also provided a drainage point in the centre of the underside of the fitting 131, which is fitted with a threaded plug 170.

The manner of use of the second embodiment 131 is very similar to that of the first embodiment 31. The difference is that in the case of the second embodiment 131, the two ends of the fitting 131 are isolated not just by one closure plate but by two, each slidably engaged with slots in one of the enlarged body portions 132a, 132b. This increases the security of the fitting, in that should water leak past one of the closure plates, eg from an existing live main under pressure, it does not contaminate the pipe at the other side of the other closure plate (eg a new main) but instead collects in the central space between the closure plates from where it can be pumped off via the additional port 163 or drained off by removal of the plug 170. Because the central space is at lower pressure than either of the mains, any leakage takes place from the main into the central space, rather than vice versa.

A typical installation of the second embodiment 131 is illustrated in FIG. 12, which shows the fitting 131 connected at one end to a T-piece 151 installed in an existing water main 152 and at the other end to a double-flanged extension pipe 153 that may in turn be connected to a new main (not shown).

Figure 13:
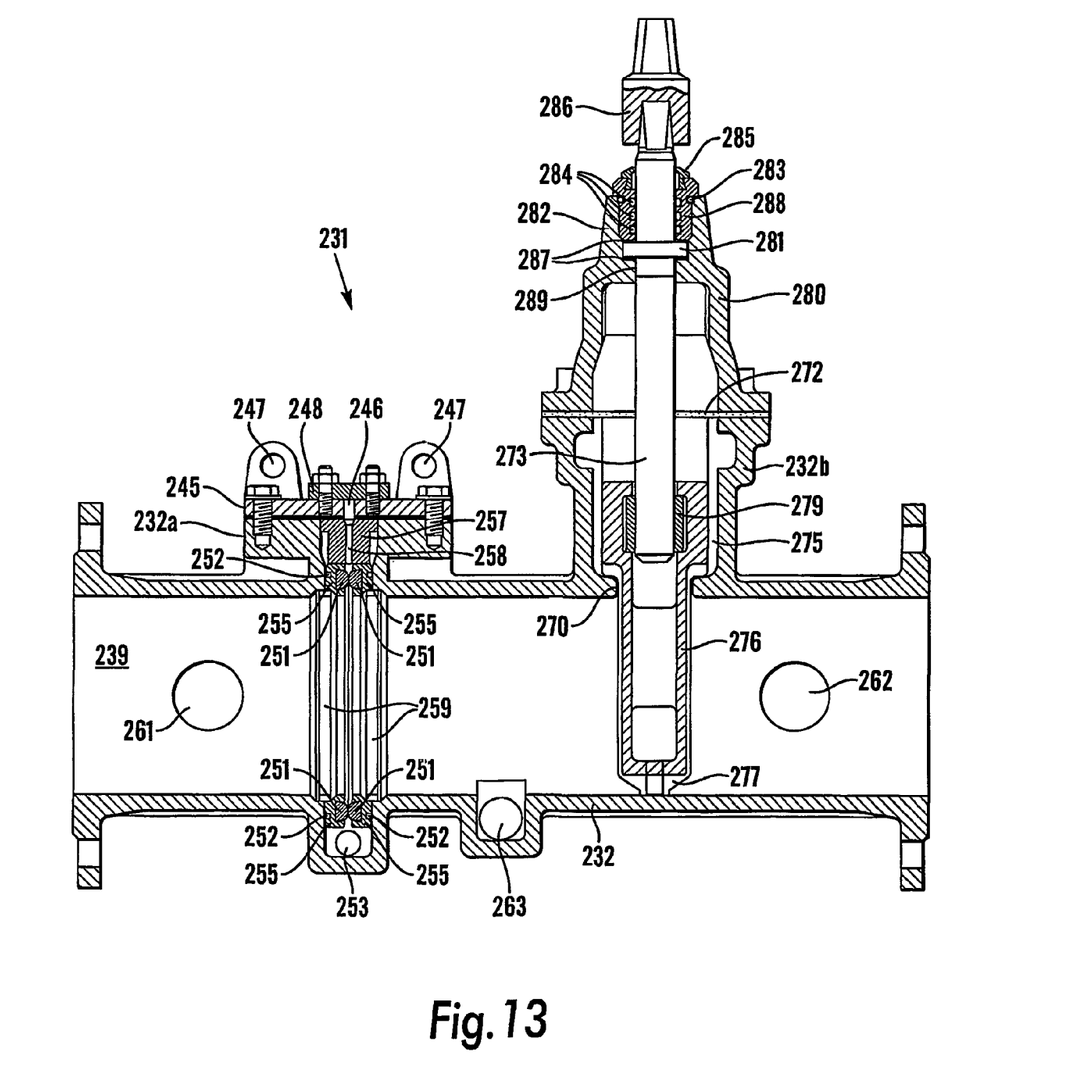
FIG. 13 is a sectional side view of a third embodiment of a pipe fitting according to the invention.

Turning now to FIG. 13, a third embodiment of a pipe fitting according to the invention is generally designated 231. The body 232 of the pipe fitting 231 comprises two enlarged portions 232a, 232b, and outlet ports 261, 262 which correspond in form and function to the ports 131, 132 of the second embodiment. There is also provided an outlet port 263, corresponding in function to the outlet port 163 in the second embodiment, positioned in the underside of the body 232.

Where the third embodiment 231 differs from the second embodiment 131 is that, instead of the enlarged portions 232a, 232b receiving identical closure plates of the form shown in FIG. 9, the second enlarged portion 232b houses a valve of the resilient-seat type in which a valve plate 276 is driven by a screw-threaded spindle 273, as described below.

The first enlarged portion 232a of the body 232 extends above and below the central bore 239 of the body 232. The first enlarged portion 232a is shaped in order to accept a closure plate of the form shown in FIG. 9. The upper section of the enlarged portion 232a also comprises solid horizontal extensions which extend in the longitudinal direction of the fitting 231.

The upper part of the first enlarged portion 232a has a plate 245 bolted to the top, the bolts passing into the solid extensions. The plate 245 is formed with a vertical slot 246, through which the closure plate can be inserted. The plate 247 is formed with integral upstanding lugs 247, which provide means for fixing a jack (not shown) to the pipe fitting 231 in order to raise or lower the closure plate. A cover plate 248 is bolted to the plate 245 to seal the slot 246 in the plate 245.

Within the upper section of the first enlarged portion 232a, under the plate 245, there is a closure plate guide 257 comprising a slot 258 which is aligned with the slot 246 in the plate 245. Within the enlarged portion 232a, adjacent to the periphery of the central bore 239 of the body 232, there are two annular seal housings 255 of C-shaped cross-section. The seal housings 255 fit closely to the inside of the first enlarged portion 232a and the limbs of each seal housing 255 are aligned towards each other.

Within each seal housing 255 there is a main seal 251 which is encompassed almost completely by the limbs of the seal housing 255. The main seals 251 are in contact with each other, the points of contact of the main seals 251 lying in the plane of the slots 246, 258. In addition, there is a small rectangular recess in the outer side of each seal housing 255 within which there is a secondary seal 252. In the lower section of the first enlarged portion 232a, there is a drain port 253 beneath the seal housings 255 which is normally closed by a plug (not shown). Two plastic rings 259 are held in position by grooves in the interior wall of the central bore 239 and serve to hold the seal housings 255 in position.

The second enlarged portion 232b of the body 232 is of generally larger dimensions than the first enlarged portion 232a. The second enlarged portion 232b includes an opening 270 leading vertically to an enclosure 275. The enclosure 275 is closed on top by a dome 280 that is bolted onto the top of the second enlarged portion 232b, a gasket 272 being interposed between the enclosure 275 and the dome 280.

A spindle 273 is mounted axially for rotation within the enclosure 275. A threaded drive ring 279 is mounted on the spindle 273 and is captivated within the enlarged upper part of a valve plate 276 such that rotation of the spindle 273 causes the drive ring 279 to travel along the spindle 273 and hence raises or lowers the valve plate 276. The lower part of the valve plate 276 has a resilient coating 277 which extends upwards as far as the underside of the enlarged upper part of the valve plate 276.

The dome 280 also comprises a ring 282 on its upper side which supports an annular gland 288 within the ring 282. The gland 288 is formed with grooves in its interior surface and a groove in its external surface which contain sealing rings 284, 283. The external sealing ring 283 presses against the interior surface of the ring 282.

The spindle 273 extends vertically through an opening 289 in the dome 280. The spindle 273 fits closely through the centre of the gland 288 and the sealing rings 284. The spindle 273 further comprises a support ring 281 positioned between the gland 288 and the upper surface of the dome 280 which holds the spindle 273 in the correct vertical position. Bearings 287 between the support ring 281 and the gland 288 and between the support ring 281 and the upper surface of the dome 280 facilitate the rotation of the spindle 273.

The upper end of the spindle 273 extends through the gland 288 and the a sealing ring 285 engaged with the gland 288. A tapered dolly 286 is attached to the top of the spindle to receive a valve key (not shown). Turning of the valve key in one direction rotates the spindle 273, which in turn raises the threaded drive nut 279, which in turn raises the valve plate 276 into the enclosure 275. Turning of the valve key in the other direction rotates the spindle 273 in the opposite direction, which in turn lowers the threaded drive nut 279, which in turn lowers the valve plate 276 into engagement with the interior of the body 232.

When the threaded drive ring 279 is in its lowest position, the resilient coating 277 on the lower side of the enlarged upper part of the valve plate 276 is pressed against the lower wall of the enclosure 275, thereby sealing the enclosure 275 from the central bore 239. In addition, the valve plate 276 is fully extended into the second enlarged portion 232b with the resilient coating 277 pressing against the interior walls of the second enlarged portion 232b. The valve plate 276 and resilient coating 277 thereby prevent the flow of fluids along the central bore 239.

A closure plate may also be inserted into the first enlarged portion 232a by removing the cover plate 248. The closure plate is inserted, using a jack or otherwise, through the slots 246, 258 in the plate 245 and the plate guide 257 respectively and pressed downwards between the main seals 251 until the flow of fluid along the central bore 239 of the fitting 231 is prevented. The valve is opened by removing the closure plate, thereby allowing fluid flow along the central bore 239 of the fitting 231. The slot 246 in the plate 245 is sealed by replacing the cover plate 248.

The manner of use of the third embodiment 231 is very similar to that of the second embodiment 131. The difference is that the third embodiment 231 includes a resilient seat valve which may be better suited to the interruption of dynamic fluid flow. Where the pipe fitting is installed in a live main under pressure and it is desired to interrupt the flow of water along that main, then the valve plate 276 is lowered by rotation of the spindle 273 until the resilient coating 277 seats against the internal surfaces of the body 232. If necessary, a closure plate may then be inserted into the first enlarged portion 232a.

The invention claimed is:

1. A pipe fitting comprising
a body adapted for connection at a first end thereof to a supply pipe and at a second end thereof to a distribution pipe so as to permit fluid communication between the supply pipe and the distribution pipe, the body being provided with a first valve device by which said fluid communication can be interrupted, and the body being provided with an upstream port and a downstream port, respectively upstream and downstream, in use, of said first valve device, said upstream port and said downstream port being adapted for temporary connection to the ends of a by-pass pipe that enables the first valve device to be by-passed and fluid from the supply pipe to be introduced to the distribution pipe.

2. A pipe fitting as claimed in claim 1, wherein the first valve device comprises a closure plate adapted to be received within the body of the pipe fitting.

3. A pipe fitting as claimed in claim 2, wherein the closure plate is engageable with the body of the pipe fitting with a sliding action.

4. A pipe fitting as claimed in claim 3, wherein the closure plate slides in a slot formed in the body of the fitting, transverse to the longitudinal axis of the pipe fitting, seals of an elastomeric material being provided around the periphery of the slot and/or the periphery of the closure plate to prevent leakage of water or other fluid past the closure plate.

5. A pipe fitting as claimed in claim 2, wherein the closure plate is completely removable from the pipe fitting.

6. A pipe fitting as claimed in claim 5, wherein in order to facilitate sliding movement of the closure plate, a part of the closure plate which extends externally of the pipe fitting is formed with an engagement device.

7. A pipe fitting as claimed in claim 6, wherein said engagement device comprises a jacking device having a threaded spindle by rotation of which the closure plate may be moved.

8. A pipe fitting as claimed in claim 2, wherein the closure plate is retractable from its operative position, in which flow of fluid through the pipe fitting is interrupted, into a recess or enclosure fonning part of the pipe fitting.

9. A pipe fitting as claimed in claim 8, wherein the closure plate is linked to an actuating mechanism that is operable from the exterior of the pipe fitting.

10. A pipe fitting as claimed in claim 9, wherein the actuating mechanism comprises a threaded spindle which projects from the pipe fitting and by rotation of which the closure plate may be raised or lowered.

11. A pipe fitting as claimed in claim 2, wherein the closure plate has a coat of a resilient material.

12. A pipe fitting as claimed in claim 1, wherein said upstream and downstream ports are aligned symmetrically on either side of a closure plate.

13. A pipe fitting as claimed in claim 1, wherein said upstream and downstream ports open upwardly in use.

14. A pipe fitting as claimed in claim 1, wherein said downstream port opens into the interior of the pipe fitting horizontally, the outlet of the downstream port being aligned with the centre of the pipe fitting.

15. A pipe fitting as claimed in claim 1, wherein said upstream and downstream ports are fitted, in use, with valves, the valves being adapted for connection to the ends of a temporary by-pass pipe.

16. A pipe fitting as claimed in claim 1, further comprising a second valve device, the first and second valve devices being spaced apart on the longitudinal axis of the pipe fitting, both the first and second valve devices being located between said upstream and downstream ports.

17. A pipe fitting as claimed in claim 16, wherein at least one of the first and second valve devices comprises a closure plate driven by rotation of a threaded spindle, which projects from the pipe fitting and by rotation of which the closure plate may be raised or lowered.

18. A pipe fitting as claimed in claim 17, wherein the closure plate has a coat of a resilient material.

19. A pipe fitting as claimed in claim 16, wherein one of the first and second valve devices comprises a closure plate which is completely removable from the pipe fitting.

20. A pipe fitting as claimed in claim 1, wherein the pipe fitting is adapted for use with pipes with bores of the order of several tens of millimeters and greater.

21. A pipe assembly comprising a supply pipe and a distribution pipe, and a pipe fitting as claimed in claim 1 interposed therebetween.

22. A pipe assembly as claimed in claim 21, wherein the supply pipe is an existing potable water main and the distribution pipe is a new main connected to the existing main.

23. A method of connecting a new water main to an existing water main, which method comprises:
    installing between the existing main and the new main a pipe fitting provided with a first valve device movable from an open position in which the existing main and the new main are in communication, to a closed position in which water flow from the existing main to the new main is interrupted;
    forming a temporary conduit from an upstream port in said pipe fitting to a downstream port in said pipe fitting, said temporary conduit containing a unidirectional valve device and sterilant injection device that injects a sterilant into said temporary conduit;
    with the first valve device in the closed position, flushing the new main with water from the existing main via the temporary conduit;
    closing off and removing the temporary conduit; and
    moving the first valve device to the open position.

24. A pipe fitting comprising a body adapted for connection at a first end thereof to a supply pipe and at a second end thereof to a distribution pipe to permit fluid communication between the supply pipe and the distribution pipe, the body being provided with a first valve means by which the fluid communication can be interrupted, and the body being provided with an upstream port and a downstream port, respectively upstream and downstream, in use, of the first valve means, the upstream port and the downstream port being fitted, in use, with valves adapted for temporary connection to the ends of a by-pass pipe that enables the first valve means to be by-passed and fluid from the supply pipe to be introduced to the distribution pipe.

25. The pipe fitting as set forth in claim 24, wherein the first valve means comprises a closure plate adapted to be received within the body of the pipe fitting.

26. The pipe fitting as claimed in claim 25, wherein the closure plate is engageable with the body of the pipe fitting with a sliding action.

27. The pipe fitting as claimed in claim 26, wherein the closure plate slides in a slot formed in the body of the fitting, transverse to the longitudinal axis of the pipe fitting, seals of an elastomeric material being provided around the periphery of the slot and/or the periphery of the closure plate to prevent leakage of water or other fluid past the closure plate.

28. The pipe fitting as claimed in claim 31, wherein the closure plate is completely removable from the pipe fitting.

29. The pipe fitting as claimed in claim 28, wherein in order to facilitate sliding movement of the closure plate, a part of the closure plate which extends externally of the pipe fitting is formed with an engagement device.

30. The pipe fitting as claimed in claim 29, wherein the engagement device comprises a jacking device having a threaded spindle by rotation of which the closure plate may be moved.

31. The pipe fitting as claimed in claim 25, wherein the closure plate is retractable from its operative position, in which flow of fluid through the pipe fitting is interrupted, into a recess or enclosure forming part of the pipe fitting.

32. The pipe fitting as claimed in claim 31, wherein the closure plate is linked to an actuating mechanism that is operable from the exterior of the pipe fitting.

33. The pipe fitting as claimed in claim 32, wherein the actuating mechanism comprises a threaded spindle which projects from the pipe fitting and by rotation of which the closure plate may be raised or lowered.

34. The pipe fitting as claimed in claim 25, wherein the closure plate has a coat of a resilient material.

35. The pipe fitting as claimed in claim 24, wherein the upstream and downstream ports are aligned symmetrically on either side of a closure plate.

36. The pipe fitting as claimed in claim 24, wherein the upstream and downstream ports open upwardly in use.

37. The pipe fitting as claimed in claim 24, wherein the downstream port opens into the interior of the pipe fitting horizontally, the outlet of the downstream port being aligned with the centre of the pipe fitting.

38. The pipe fitting as claimed in claim 24, further comprising a second valve device, the first and second valve devices being spaced apart on the longitudinal axis of the pipe fitting, both the first and second valve devices being located between the upstream and downstream ports.

39. The pipe fitting as claimed in claim 38, wherein at least one of the first and second valve devices comprises a closure plate driven by rotation of a threaded spindle, which projects from the pipe fitting and by rotation of which the closure plate may be raised or lowered.

40. The pipe fitting as claimed in claim 39, wherein the closure plate has a coat of a resilient material.

41. The pipe fitting as claimed in claim 38, wherein one of the first and second valve devices comprises a closure plate which is completely removable from the pipe fitting.

42. The pipe fitting as claimed in claim 24, wherein the pipe fitting is adapted for use with pipes with bores of the order of several tens of millimeters and greater.

* * * * *